(12) United States Patent
Buard et al.

(10) Patent No.: US 8,174,285 B2
(45) Date of Patent: May 8, 2012

(54) COMPONENT PROVIDED WITH AN INTEGRATED CIRCUIT COMPRISING A CRYPTOROCESSOR AND METHOD OF INSTALLATION THEREOF

(75) Inventors: Nadine Buard, Meudon (FR); Cedric Ruby, Lyons (FR); Florent Miller, Levallois (FR); Imad Lahoud, Paris (FR)

(73) Assignee: European Aeronautic Defence and Space Company EADS, Paris (FR)

( * ) Notice: Subject to any disclaimer, the term of this patent is extended or adjusted under 35 U.S.C. 154(b) by 574 days.

(21) Appl. No.: 12/300,138

(22) PCT Filed: Apr. 27, 2007
(Under 37 CFR 1.47)

(86) PCT No.: PCT/FR2007/051185
§ 371 (c)(1),
(2), (4) Date: Aug. 4, 2009

(87) PCT Pub. No.: WO2007/128932
PCT Pub. Date: Nov. 15, 2007

(65) Prior Publication Data
US 2011/0043245 A1  Feb. 24, 2011

(30) Foreign Application Priority Data
May 10, 2006  (FR) ...................................... 06 51681

(51) Int. Cl.
*H03K 19/003* (2006.01)
*H01L 31/101* (2006.01)
(52) U.S. Cl. ......... 326/15; 326/8; 365/185.09; 257/115; 257/157
(58) Field of Classification Search ................ 326/8–15; 325/185.09, 150; 257/115, 157, 372, 373, 257/394, 659, 660; 365/185.09, 150
See application file for complete search history.

(56) References Cited

U.S. PATENT DOCUMENTS

| | | | | |
|---|---|---|---|---|
| 5,629,545 A | * | 5/1997 | Leach | 257/362 |
| 5,637,892 A | * | 6/1997 | Leach | 257/362 |
| 5,672,918 A | | 9/1997 | Kimbrough et al. | |
| 5,804,477 A | * | 9/1998 | Lien | 438/210 |
| 6,031,267 A | * | 2/2000 | Lien | 257/344 |
| 6,064,555 A | | 5/2000 | Czajkowski et al. | |
| 6,128,216 A | * | 10/2000 | Noble et al. | 365/154 |
| 6,751,110 B2 | * | 6/2004 | Hu | 365/49.12 |

(Continued)

OTHER PUBLICATIONS

Johnston A H et al, "Latchup in Integrated Circuits from Energetic Protons", The research in this paper was carried out by the Jet Propulsion Laboratory, California Institute of Technology, under contract with the National Aeronautics and Space Administration, Code Q, under the NASA Micro, Dec. 1997, pp. 2367-2377, IEEE Transactions on Nuclear Science, IEEE Service Center, New York, NY, US. ZP011041051.

(Continued)

*Primary Examiner* — Vibol Tan
(74) *Attorney, Agent, or Firm* — Perman & Green, LLP

(57) ABSTRACT

In order to protect an integrated circuit provided with a cryptoprocessor from attacks aiming to reveal secrets, it is anticipated to use a component sensitive to the activation of a parasitic (latchup) thyristor and/or to the activation of a parasitic bipolar transistor, or to design a circuit having this property. If the component is stressed due to the presence of this circuit, it is immediately deactivated, actually preventing the revelation of the secrets thereof.

6 Claims, 2 Drawing Sheets

U.S. PATENT DOCUMENTS 6,809,386 B2 * 10/2004 Chaine et al. ............... 257/368
6,888,732 B2 *  5/2005 Hu ........................... 365/49.11

OTHER PUBLICATIONS

Sexton, Fred W., "Destructive Single-Event Effects in Semiconductor Devices and ICs", IEEE Transactions on Nuclear Science, vol. 50., No. 3, Jun. 2003, pp. 603-621, NM, US.

Gabrielli, A., "Proposal for Solid-State Particle Detector Based on Latchup Effect", Electronics Letters, May 26, 2005, vol. 41., No. 11.

Fairchild Semiconductor Corporation, "Understanding Latch-Up in Advanced CMOS Logic", Jan. 1989, Revised Apr. 1999, pp. 1-4.

Page Jr., Thomas E., et al, "Extreme Latchup Susceptibility in Modern Commerical-off-the Shelf (COTS) Monolithic 1M and 4M CMOS Static Random-Access Memory (SRAM) Devices".

Neve, Michael et al, "Memories: A Survey of Their Secure Uses in Smart Cards", UCL Crypto Group, Catholic University of Louvain, Microelectronic Laboratory, Louvain-la-Neuve, Belgium.

International Search Report dated Oct. 12, 2007. & French Search Report dated Aug. 29, 2007.

* cited by examiner

US 8,174,285 B2

COMPONENT PROVIDED WITH AN INTEGRATED CIRCUIT COMPRISING A CRYPTOROCESSOR AND METHOD OF INSTALLATION THEREOF

CROSS REFERENCE TO RELATED APPLICATIONS

This application is the National Stage of International Application No. PCT/FR2007/051185 International Filing Date, 27 Apr. 2007, which designated the United States of America, and which International Application was published under PCT Article 21 (2) as WO Publication No. WO2007/128932 and which claims priority from French Application No. 0651681, filed on 10 May 2006, the disclosures of which are incorporated herein by reference in their entireties.

BACKGROUND

1. Field

A component produced entirely or partly in the form of an integrated circuit and equipped with a cryptoprocessor, and a method for installing the component. The component according to the disclosed embodiments is equipped with means for preventing its encryption secrets from being revealed. The disclosed embodiments are directed most particularly to cryptoprocessor components, but it might equally relate to all types of integrated circuits in which efforts are made to prevent them from functioning incorrectly, whether such incorrect functioning is caused by a concerted attempt to corrupt their operation or by a random attack from an external source (electrical, electromagnetic, thermal, particulate or other).

Data stored in an electronic component has always been protected by encryption with the aid of a key. It is imperative that the key remain secret.

2. Brief Description of Related Developments

In an electronic component, a cryptoprocessor is a processor that is dedicated to cryptographic operations. Its memory part contains one or more keys, which must remain secret, and which it uses for encrypting and/or decrypting the information it receives. Its primary elements include a non-volatile memory, which stores the key permanently when it is deactivated, a volatile buffer memory (of SRAM or D flip flop type, for example) in which the key is loaded by the operating system (if one exists) when the component is energized, and a microcontroller or microprocessor type logic circuit that is capable of performing operations for encrypting and decrypting messages using the secret key.

In electronic components, information is stored and forwarded in the form of charges which are trapped or guided inside the semiconductor material, silicon, by the action of electrical fields. A MOS transistor, which is at the heart of most digital logic circuits, is in effect a switch that allows charges to pass or prevents them from passing between its source and its drain depending on the voltage applied to its gate.

A new threat has surfaced recently, which is designed to extract the information contained in a cryptoprocessor component by injecting errors into it and analyzing the behaviour this provokes. There are many different methods for injecting usable errors (raising the temperature of the component, increasing the supply voltage to the component, transitory pulses, particles, and others). The methods that are assessed as being the most dangerous today are those which enable the errors to be injected into components with controlled areas, for example in a part of the static random access memory, SRAM, where an encryption key is stored. This is what happens during attacks using lasers or ion microbeams.

An attack on a cryptoprocessor by injecting errors consists of injecting charges locally so as to modify or mask the information that is being stored or forwarded. Analysis of the response by the cryptoprocessor following the injection of errors provides pirates with clues that help them to reduce the number of combinations and identify the key more quickly. An analysis of this kind is made even easier by the fact that the attack is very precise, in terms of both space and time. Various techniques exist for injecting errors, and variously difficult to execute; fortunately the most effective are also the most difficult to implement. For the record, a review of possible attacks on integrated circuits is included in the document "Memories: a survey of their secure uses in smart cards" written by Michael Neve, Eric Peeters, David Samyde and Jean-Jacques Quisquater; http://www.dice.ucl.ac.be/crypto, and edited by Second International IEEE Security in Storage, Workshop—Proceedings of SISW 2003.

The simplest methods inject errors into the component randomly: this is what happens when the attack takes the form of raising the temperature, electromagnetic waves (radar, microwaves, radio), or particles (ions, neutrons or protons). In all three cases, the attack interferes with the whole component, and while it may be possible to select a zone, it is not possible to target a single bit or even several bits. Even so, with software processing and extremely advanced mathematics, it seems that it may be possible to exploit the results of such an attack. This type of attack is very easy to carry out because it does not require any specific access and can be conducted from a distance.

Then come the attacks via the circuit's input/outputs, which disrupt the nominal voltage using a voltage generator. These attacks can be carried out in phase (temporally) relative to the operating cycles of the circuit's clock. The result of the attack is still rather inconsistent, which means that a large number of combinations remain to be tried in order to extract the key, but this method is quite easy to carry out if one has access to the circuit.

Finally, methods by which the errors can be injected at chosen times and targeted extremely precisely (in theory, to the bit), which means for example that the attacker is then able to modify the bits containing the key one by one, then the next, and so on, or even to interrupt the decryption operation. This is what happens in attacks using a laser or ion microbeams. These methods are difficult to put into operation because they require access to the component, that is to say the component's housing must be opened and the integrated circuit and chip must be exposed. In order to defend themselves from these attacks, manufacturers implement countermeasures to prevent decapsulation, the effectiveness of which is variable.

The aspects of the disclosed embodiments protect components against attacks of this nature.

Triggering of a parasitic thyristor, called latchup, and also triggering of a bipolar parasitic transistor, called snapback, are mechanisms that are inherently included in any component of an integrated circuit of the backup implantation, CMOS type for the first mechanism, or the non-backup implantation type for the other. They are effected by activation of the parasitic thyristor, or horizontal bipolar transistor in the second case, after charges are introduced into the component locally. The supply current for the component then rises sharply, and because of the current that passes through it and/or the fall in supply voltage this causes, the component ceases functioning. If there is no limitation on the current, the thermal effect may destroy the circuit, and it is preferable to provide current limitation on the circuit feed. In any event, the circuit does not become functional again until the supply has been cut off and it has been energized again. In the rest of this document, we will use the term parasitic triggering to refer to the activation of either of these phenomena: triggering of a parasitic thyristor: latchup et triggering of a parasitic bipolar transistor: snapback. Both of these phenomena are described in the document published in 1999 by Fairchild Semiconductor Corporation entitled Understanding Latch-up in Advanced CMOS Logic.

Depending on the position of the contacts in the component, the charge level that triggers the parasitic structures (called the latchup threshold or snapback threshold) may vary widely. Component manufacturers therefore generally try to raise this level to the maximum, since the mechanism can be triggered by a natural radiant environment (particles), by electrostatic discharges, or even by noise at the inputs or outputs. Nevertheless, it seems easier for a chip manufacturer to design a technology that is sensitive to latchup/snapback than a technology that is insensitive.

As a general rule, it has been noted that the first batches manufactured at each generation jump are sensitive to latchup. Then, the manufacturers correct the manufacturing procedures of the architecture of the component circuitry so that the components have higher triggering thresholds. As a consequence, many components that are sensitive to latchup have found their way onto the commercial market, which forces those who use these components in a severely radiant environment (such as the space environment, for example) to carry out systematic sorting of commercial components.

Studies on the susceptibility of integrated circuits to latchup have been published in an article entitled "Extreme latchup susceptibility in modern commercial off the shelf (COTS) monolithic 1 M and 4 M CMOS static random access memory (SRAM) devices" written by Thomas E. Page and Joseph M. Benedetto, and published in Radiation Effects Data Workshop, 2005. IEEE, 11-15 Jul. 2005, pages 1 to 7 by IEEE Transactions on Nuclear Science, Vol 50. No. 3, June 2003.

in an article entitled "Destructive single event effect in semiconductor devices and ICs" by Fred W. Sexton, and in "Proposal for solid state particle detection based on latchup effect" written by A. Gabrielli and published in Electronic Letters, 26 May 2005 Vol. 41, No. 11.

Injecting errors is a local injection of charges into a circuit that disrupts the proper function thereof. The minimum charge quantities needed to cause this disruption may be defined as the circuit disruption threshold. The threshold for latchup or snapback is defined as the minimum charge quantity that must be injected locally to trigger the latchup or snapback mechanism.

We have chosen to exploit this effect in the disclosed embodiments to resolve the problem of protecting the components of integrated circuits with cryptoprocessors in order to protect the information contained in a component against injection of errors. In fact, if all of a component with cryptoprocessor (or at least the parts containing the key in transient manner) is constructed using circuits that have been deliberately chosen to be sensitive to latchup or snapback, that is to say with a trigger threshold lower than the threshold for disrupting circuits by injecting errors, the component is protected intrinsically. In the event of error injection (that is to say charge injection) by any means whatsoever, the parasitic structure is activated. This activation causes the supply current for the circuit to rise extremely sharply.

This very large current can damage the integrated circuit component irreparably. To avoid this final drawback, a simple latchup detection circuit is provided (by measuring the increase in the supply current to the component). For example, this detection circuit is of the same type as the one described in the last article cited above. This detection circuit then enables activation of a current limiting circuit so that the component is not destroyed. The current limiting circuit maintains the supply voltage for the internal parts of the circuit at a voltage below that which is needed to allow it to function. Therefore, the component can no longer function until it is re-initialized, which makes it impossible to extract any data from it. In fact, such a solution comes down to using the cryptoprocessor itself as the immediate detector of an attack.

SUMMARY

The aspects of the disclosed embodiments provide a component in an integrated circuit containing a cryptoprocessor, that includes one or more internal structures of parasitic thyristors and/or parasitic bipolar transistors that are likely to be activated.

A further aspect of the disclosed embodiments is a method for installing a component in an integrated circuit with cryptoprocessor, that it includes an operation of selecting the component from a batch of components, the criterion for this selection being a particular susceptibility of the component to activate parasitic thyristors (latchup) or to activate parasitic bipolar transistors (snapback), such susceptibility being defined with respect to an activation threshold.

The disclosed embodiments will be better understood upon reading the following description and review of the accompanying figures. The figures are for illustrative purposes only and are not intended to be limiting of the disclosed embodiments in any way. The figures show:

DETAILED DESCRIPTION OF THE DISCLOSED EMBODIMENTS

Figure 1:
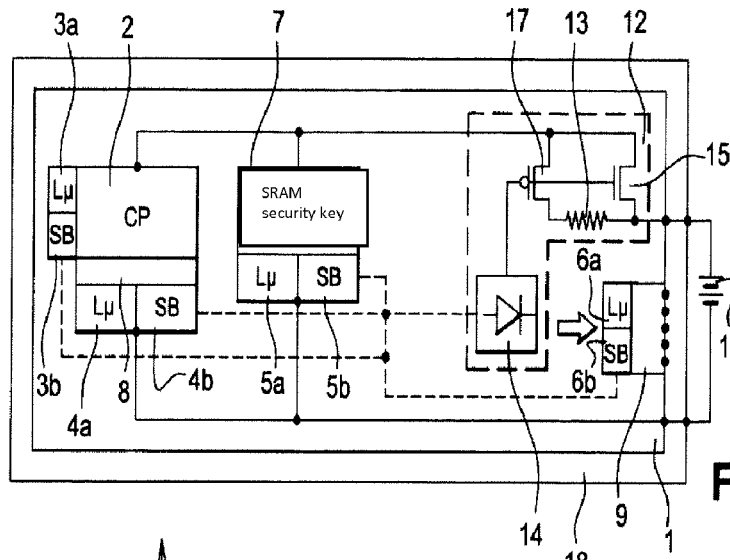
FIG. 1: a schematic representation of a component with integrated circuit according to the disclosed embodiments.
Figure 2:
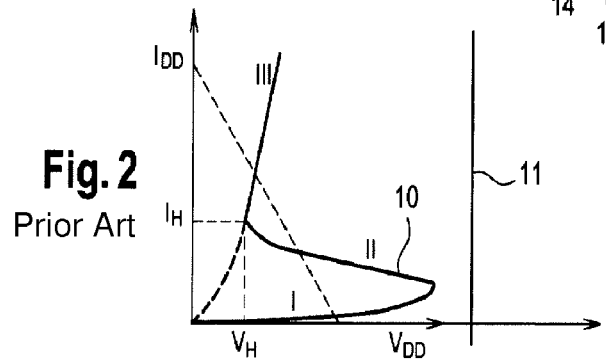
FIG. 2: a conventional representation of an activation phenomenon of a parasitic thyristor.

FIG. 1 shows a component 1 equipped with an electronic integrated circuit according to the disclosed embodiments. The component may be monolithic or hybrid. All of component 1, or each of its parts, is manufactured according to this integrated circuit technology by implanting impurities, diffusing metallizations and oxidations, all selective, in a semiconductor crystal (even a strip of amorphous semiconductor material). The semiconductor material is normally silicon, but it might also be germanium or some other substance. The architecture of the implant, metallization and oxidation zones forms electronic circuits having different functionalities. Thus, component 1 of the disclosed embodiments essentially has one cryptoprocessor circuit 2. According to an essential feature of the disclosed embodiments, component 1 includes structures of parasitic thyristors LU (for latchup), and/or parasitic bipolar transistors (SB for snapback). Four structures of this type are shown, and are identified as 3a to 6b according to their location in component 1. In practice, activation zones 3a to 6b are located together with the integrated circuit transistors.

Typically, these structures 5a 5b of parasitic thyristors and/or parasitic bipolar transistors may be located right inside the elementary patterns of a static RAM type memory zone 7 of component 1.

Alternatively, these structures 4a 4b of parasitic thyristors and/or parasitic bipolar transistors may be located right inside the elementary patterns of a buffer memory zone 8 of component 1. The buffer zone is generally a register of cryptoprocessor 2, and is very close to it. Alternatively, these structures 3a 3b of parasitic thyristors and/or parasitic bipolar transistors may be located right inside the cells of a combinational zone of the component. Typically in this case, circuits 3a and/or 3b are located in the zone of the circuits for cryptoprocessor 2.

Alternatively, these structures 6a 6b of parasitic thyristors and/or parasitic bipolar transistors may be located in a zone 9 for input and/or output circuits for component 1. All methods of injecting errors, whether localized or not, inherently activate the parasitic thyristors (latchup mechanism) and/or the parasitic bipolar transistors (snapback mechanism) in a sufficiently sensitive component since they are activated by the occurrence of the error (introduction of charges). However, an appropriate medium must be found in order to ensure that the mechanism is not activated at the wrong time as result of noise, and here we will define the ideal component.

A parasitic thyristor or latchup is activated after a parasitic thyristor (p-n-p-n) inherent in CMOS technology (and particularly in the CMOS inverter) is energized. If a sufficient quantity of charges reaches the substrate and close to the reverse polarized well/substrate interface, this structure may lock itself and facilitate the passage of a strong current between the supply and earth. The passage of this current then causes damage, often irreversible, inside the component structure. If this happens, the component will become permanently inoperative.

Activation of a parasitic bipolar transistor or snapback has similar consequences to those for the latchup. In this case, the excessive conduction is not caused by the activation of a parasitic thyristor, but rather of the horizontal parasitic bipolar transistor of the field effect MOS transistors, MOSFETs. Their diffusions correspond to the drain, the source, and the MOSFET substrate. Such a phenomenon occurs particularly in NMOS components for which a thyristor is not present (because there is no PMOS), and reciprocally in a PMOS (because there is no NMOS), and in components on an insulating substrate (SOI technology).

These phenomena have been studied and observed most thoroughly with reference to natural or non-natural attacks on electronic components by neutrons, protons, heavy ions (where they are described as SEL, Single Event Latchup for a single activation event of a parasitic thyristor, and SES, Single Event Snapback for a single activation event of a parasitic bipolar transistor), and also gamma radiation. Be that as it may, in the most sensitive components, such activations may also take place following an electrostatic discharge, a relatively mild fluctuation in supply, or in a disturbed electromagnetic environment.

If the activation threshold is defined as the charge quantity that must be introduced locally in order to trigger the latchup (activation of a parasitic thyristor) or snapback phenomenon, the cryptoprocessor may be considered to be protected if the activation threshold for latchup or snapback is slightly lower than or equal to the threshold for changing the state of a bit to be protected inside a flip flop memory, or more generally, lower than the disruption threshold of any elementary cell or function of the circuit.

Figure 4:
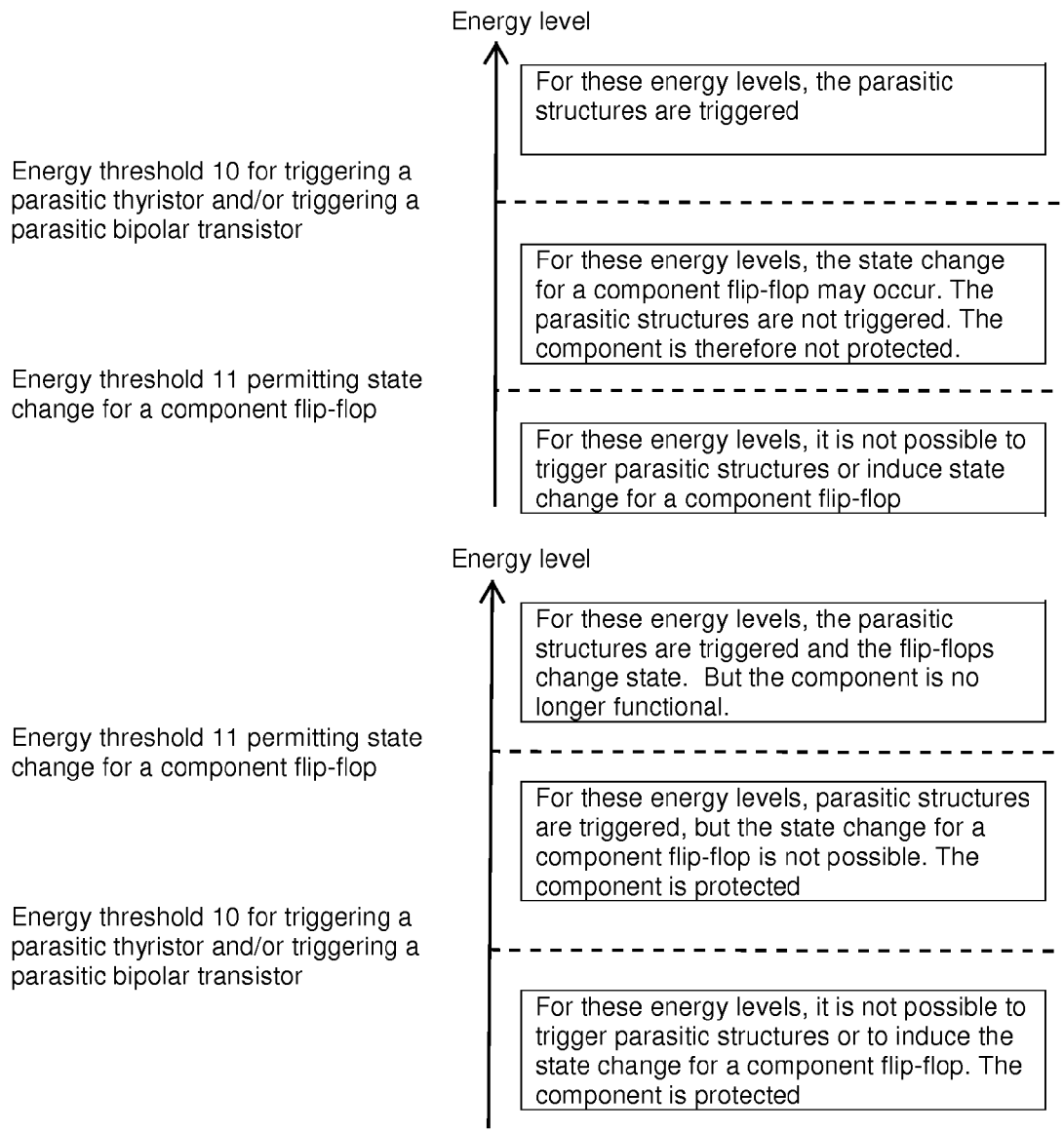
FIG. 4: illustration of the level of protection of the component when the threshold energy levels for activating the parasitic structures and for changing the state of a flip flop type memory caused by error injection are different.

Thus, according to the disclosed embodiments, FIG. 4, an energy threshold 10 (or quantity of charges) for activating a parasitic structure (latchup or snapback) is preferably lower than a quantity 11 of energy (or charge) that is needed to change the state of a flip flop memory of the component, that this flip flop is located in an SRAM or buffer memory, in a registry of the cryptoprocessor, in a combinational logic area of cryptoprocessor 2, in an input/output circuit 9, or anywhere else.

The disclosed embodiments are based on the idea that the phenomenon of parasitic structure activation occurs and prevents the functioning of component 1 even before the component has suffered any change to the electrical states of it circuits. In other words, any attempt to inject errors will disable the component first, thereby rendering it non-functional, even before any changes are made to the state of the memory cells that are to be protected. In the event that threshold 10 for parasitic activation is greater than threshold 11 for changing the state of a flip flop memory, the component is not protected because there are energy levels for which it is possible to modify the state of flip flop memories without activating the parasitic structures. In the event that parasitic activation threshold 10 is lower than flip flop state change threshold 11, the component is protected because its function is disabled before the state of its flip flop memories can be changed.

According to the disclosed embodiments, component 1 preferably includes a supply current limiter circuit 12 coupled to the circuit for activating parasitic structures. For example, very simply, current limiter 12 includes a resistor 13 that is connected in series with in supply circuit when activation of one of the parasitic structures is detected. For this purpose, a current detector 14 is connected, coupled in some way to circuits 3a to 6b. When detector 14 does not detect activation, it causes conduction of a transistor 15 that connects a supply 16 in series to circuits 2, 7, and others of component 1. When a parasitic activation is detected, a backup transistor 17 to transistor 15 actuates resistor 13 in the supply stream. This has two effects. Firstly, component 1 is not destroyed, because the current that passes through it is limited by resistor 13. Secondly, the useful voltage downstream of resistor 13 falls to such a level that component 1 can no longer function.

Limiter 12 is such that once the activation circuit has been triggered, the component is no longer functional, and its power supply must be re-initialized before it will work again.

It is not difficult to manufacture a component such as 1. A chip manufacturer is able to adjust the process parameters with regard to the supply voltage so that the item is designed automatically. At the same time, it may even be available in the storeroom: since electronic components are tested with heavy ions before they are fitted in satellites, and databases of results from tests in particle accelerators are available, all that needs to be done is to select a component whose threshold 10 is lower than threshold 11, to select the supply voltage for the component in such manner that it exhibits this property. Another way is to identify them with the aid of a laser test bench. At all events, it may be helpful, with a laser for example, to identify the sensitive zone of the component and check that the protection of information is guaranteed.

The zones that may benefit from being made sensitive to latchup or snapback are particularly: memory zone 7, buffer memory zone 8, combinational zone 2, inputs/outputs 9.

For SRAM memories, the article "Extreme . . . " cited above provides examples of references to components in various technologies that have this feature. It is also possible to find microcontrollers that satisfy these conditions. It is estimated that about 10% of the components currently on the market for 0.18 μm and 0.13 μm technologies already exhibit this feature. According to the disclosed embodiments, this situation is turned to advantage by choosing to install a component 1 selected in this way on motherboards 18, chipcards 18, or on any other device 18. Component 1 is selected in such manner that its parasitic structure activation threshold 10 (parasitic thyristor or parasitic bipolar transistor) is lower then a critical threshold 11. For example, candidate components are subject to fault tests with a critical aggression energy level, and only those that have been proven to be rendered non-functional thereby are retained. The lower the critical threshold, the greater the self-protection of the component (but the greater the risk that it will fail frequently). In a preferred example, this threshold is itself lower than threshold 11, which allows the electrical state of component 1 to be switched.

Figure 3A:
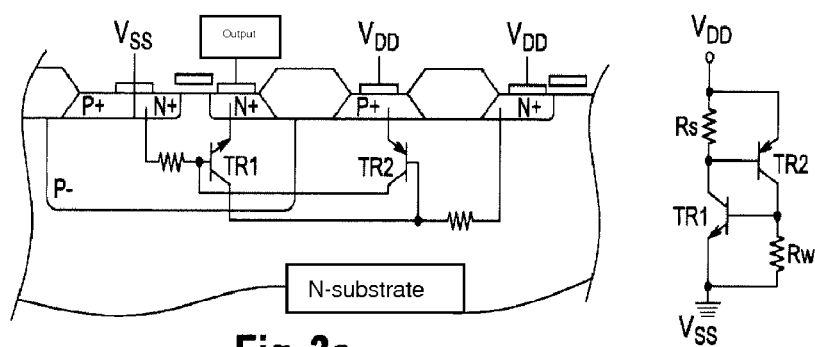
FIGS. 3a, 3b and 3c: a conventional cross section through a parasitic activation circuit and its schematic representation, and a conventional representation of the activation phenomenon of a parasitic bipolar transistor respectively.
Figure 3B:
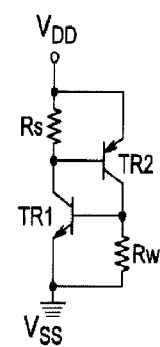
Figure 3C:
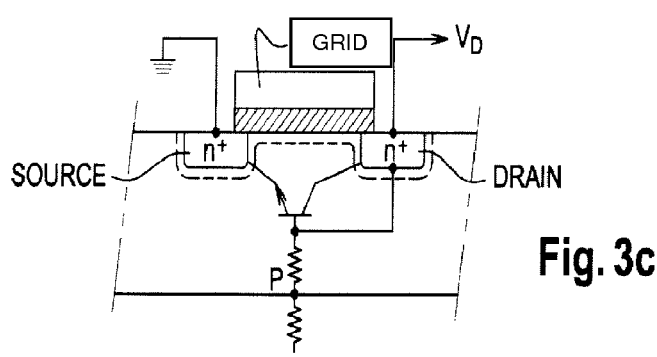

FIGS. 3*a*, 3*b* and 3*c* show the presence of an n-p-n-p parasitic thyristor created in the type n substrate in the case of activation of a parasitic thyristor, and the presence of a parasitic bipolar structure in a MOS transistor in the case of activation of a parasitic bipolar transistor.

According to the disclosed embodiments, manufacturing parameters such as length of implantation, temperature, nature of impurities, implantation voltage, which are likely to render the component more sensitive to activations of parasitic structures (parasitic thyristors and/or parasitic bipolar transistors), are selected during manufacturing. The selection is preferably such that an activation energy threshold for these parasitic structures is lower than a quantity of energy needed to change the state of a flip flop memory of the component. If necessary, these operational parameters (for example the polarization voltage) may be adjusted during manufacturing or during use. The criterion for this adjustment is the sensitivity of the component to activation of parasitic thyristors (latchup) and/or activation of parasitic bipolar transistors; this sensitivity must be higher than a threshold.

When an energy threshold 11 that enables the state of a flip flop memory in the component to be changed is lower than an energy threshold 10 that enables activation of a parasitic thyristor and/or activation of a parasitic bipolar transistor, and for an energy lower than energy threshold 11 that enables the state of a flip flop memory in the component to be changed, it is not possible to activate the parasitic structures nor cause the change in the state of a flip flop memory in the component. For an energy between energy threshold 11 that enables a change of state of a flip flop memory in the component and energy threshold 10 for activation of a parasitic thyristor and/or activation of a parasitic bipolar transistor, the change in state of a flip flop memory in the component is possible. The parasitic structures are not activated. The component is therefore not protected. For energy levels higher than an energy threshold 10 for activation of a parasitic thyristor and/or activation of a parasitic bipolar transistor, the parasitic structures are activated.

When an energy threshold 11 that enables the state of a flip flop memory in the component to be changed is higher than an energy threshold 10 that enables activation of a parasitic thyristor and/or activation of a parasitic bipolar transistor, and for energy levels lower than energy threshold 10 for activating a parasitic thyristor and/or activating a parasitic bipolar transistor, it is not possible to activate the parasitic structures nor cause the change in the state of a flip flop memory in the component. The component is protected. For an energy between energy threshold 10 for activation of a parasitic thyristor and/or activation of a parasitic bipolar transistor and an energy threshold 11 that enables the state of a flip flop memory in the component to be changed, the parasitic structures are activated but it is not possible to change of state of a flip flop memory in the component. The component is protected For energy levels higher than energy threshold 11 that enables the state of a flip flop memory in the component to be changed, the parasitic structures are activated and the states of the flip flop memories are changed, but the component is not functional.

The invention claimed is:

1. A component in an integrated circuit including a cryptoprocessor comprising:
   one or more internal parasitic activation structures of the parasitic thyristor (latchup) activation type and/or of the parasitic bipolar transistor (snapback) activation type;
   wherein
   an energy threshold for activation of the parasitic structures, parasitic thyristors and/or parasitic bipolar transistors, is lower than an energy quantity needed to change the state of a flip flop memory of the component,
   the component further comprising a supply current limiter circuit coupled to the circuit for activating the parasitic thyristors and/or parasitic bipolar transistors, wherein once this activation circuit has been activated, the component is no longer functional and a power supply of the component must be re-initialized before the component will work again.

2. The component according to claim 1,
   wherein
   the structures for activating parasitic thyristors and/or activating parasitic bipolar transistors are located in an SRAM memory zone of the component.

3. The component according to claim 1,
   wherein
   the structures for activating parasitic thyristors and/or activating parasitic bipolar transistors are located in a buffer memory zone of the component.

4. The component according to claim 1,
   wherein
   the structures for activating parasitic thyristors and/or activating parasitic bipolar transistors are located in a combinational zone of the component.

5. The component according to claim 1,
   wherein
   the structures for activating parasitic thyristors and/or activating parasitic bipolar transistors are located in an input/output circuit zone of the component.

6. A method for installing a component in an integrated circuit with cryptoprocessor, comprising:
   selecting the component from a batch of components and/or adjusting functional parameters of the component, the selection criterion and/or adjustment being a susceptibility of the component to activate parasitic thyristors (latchup) and/or to activate parasitic bipolar transistors, this susceptibility being above a threshold,
   selecting parameters during production that are likely to increase sensitivity of the component for activating a parasitic thyristor (latchup) and/or activating a parasitic bipolar transistor,
   and wherein said selection is such that an energy threshold for activating the parasitic thyristor (latchup) and/or activating the parasitic bipolar transistor is lower than an energy quantity needed to cause a flip flop memory of the component to change state,
and wherein when a supply current limiter circuit coupled to the circuit for activating the parasitic thyristors and/or parasitic bipolar transistors, has been activated, the component is no longer functional and a power supply of the component must be re-initialized before the component will work again.

* * * * *

UNITED STATES PATENT AND TRADEMARK OFFICE
CERTIFICATE OF CORRECTION

PATENT NO. : 8,174,285 B2  Page 1 of 1
APPLICATION NO. : 12/300138
DATED : May 8, 2012
INVENTOR(S) : Buard et al.

It is certified that error appears in the above-identified patent and that said Letters Patent is hereby corrected as shown below:

Title Page, Col. 1 (54) and Col. 1, line 3, Title: delete "CRYPTOROCESSOR" and insert
-- CRYPTOPROCESSOR -- therefor.

Signed and Sealed this
Tenth Day of July, 2012

David J. Kappos
*Director of the United States Patent and Trademark Office*